Nov. 6, 1928.  
C. RORABECK  
1,690,838  
INSIDE AND OUTSIDE LINK FOR CONVEYER CHAINS  
Filed April 7, 1926  2 Sheets-Sheet 1
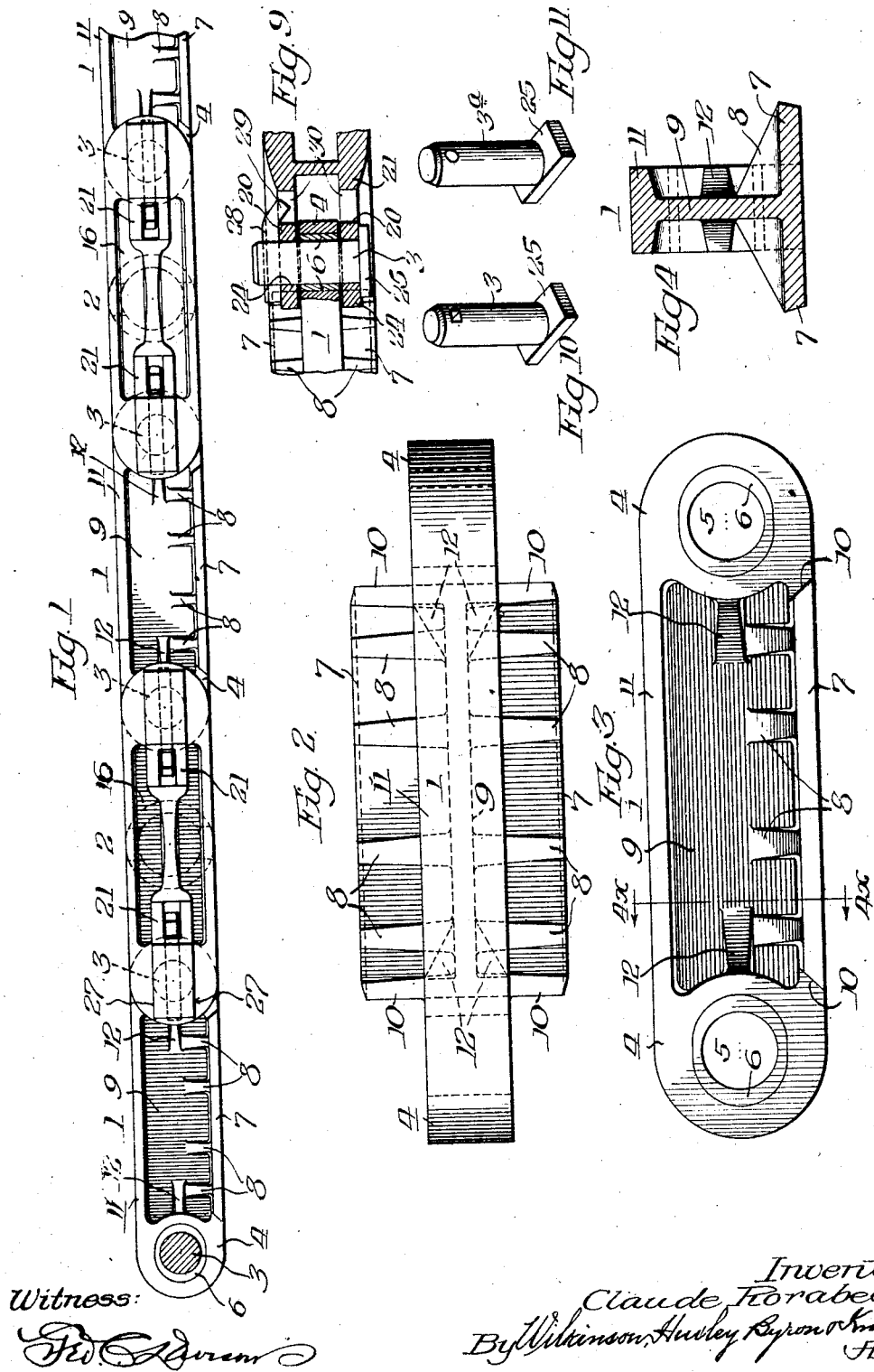
Witness:
Inventor:
Claude Rorabeck,
By Wilkinson, Hurley, Byron & Knight,
Attys.

Nov. 6, 1928.   1,690,838
C. RORABECK
INSIDE AND OUTSIDE LINK FOR CONVEYER CHAINS
Filed April 7, 1926   2 Sheets-Sheet 2
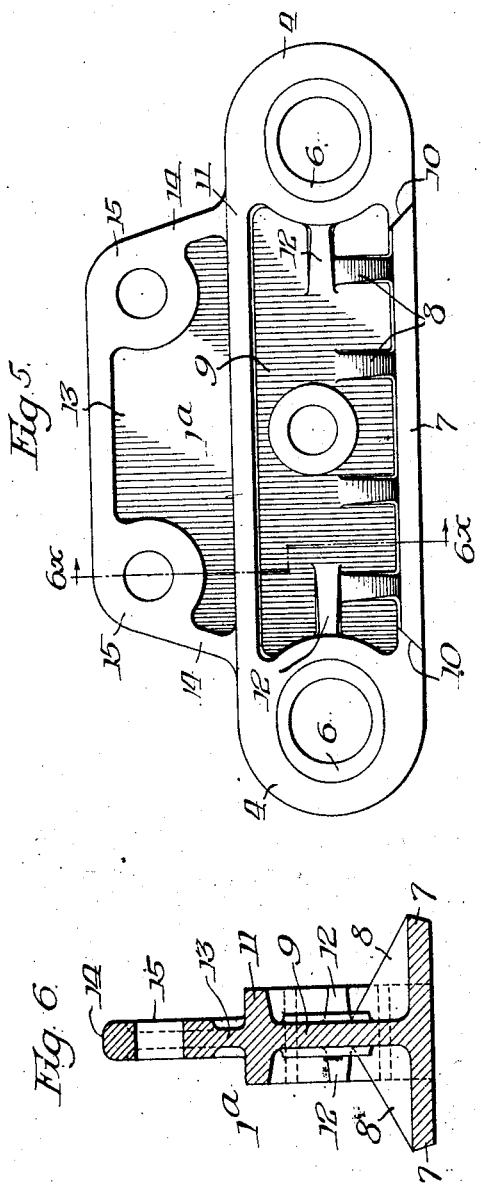
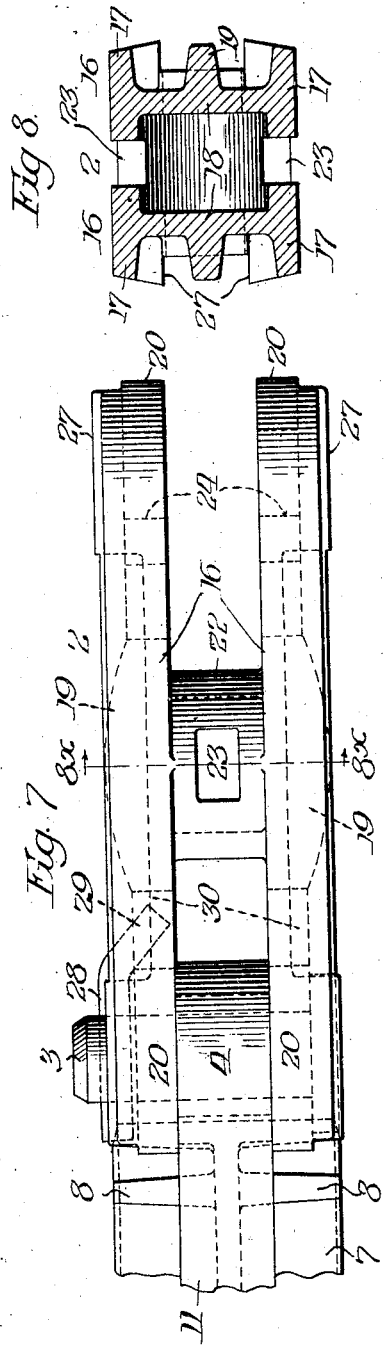
Witness
Inventor:
Claude Rorabeck,
By Wilkinson, Huxley, Byron Knight
Attys Patented Nov. 6, 1928.

1,690,838

UNITED STATES PATENT OFFICE.

CLAUDE RORABECK, OF CHICAGO HEIGHTS, ILLINOIS, ASSIGNOR TO AMERICAN MANGANESE STEEL COMPANY, OF CHICAGO, ILLINOIS, A CORPORATION OF MAINE.

INSIDE AND OUTSIDE LINK FOR CONVEYER CHAINS.

Application filed April 7, 1926. Serial No. 100,247.

This invention relates to conveyer chains made up of links articulated through means of pintles passing through ends of the links which are lapped by making one link end of reduced thickness and another link end with spaced members between which the reduced end fits.

The object of the invention is to provide all the links in a chain of this kind with a relatively broad bearing the better to stabilize them laterally and to better adapt them to pass over and around guide sheaves, driving pulleys and the like, when in use, for instance, when serving to carry excavating buckets or other forms of receptacle.

In carrying out the invention, a link with a reduced end is preferably made of reduced transverse dimension throughout its length so that each end will be an inside end, while both links adjacent thereto will be of the type in which both ends embody spaced members in their construction, thus adapting them to serve as outside links. In such a chain construction, desired lateral stability of the outside links is obtained, primarily, by the spacing of the side members thereof, the bases of which serve as rails traversing the guiding or other surfaces with which the links contact; and for providing broad bearing surfaces for the inside links, and adapting them to provide their proportion of the trackage, each will be constructed with a pair of broad lateral flanges in the plane of the base of the link and extending longitudinally thereof toward, but stopping short of the articulating ends, these flanges being suitably braced by bracket fins extending diagonally from the flanges to the web of the link. Lateral stability of the outside links is increased by providing upon the spaced longitudinal side members of such links relatively broad bearing edges sufficient to develop an overall transverse dimension corresponding substantially to that provided by the flanges on the inside links; but the broad treads on the side members of the outside links extend substantially the full length thereof, thus causing them to meet the ends of the flanges on the inside links and developing continuity of broad trackage or bearing throughout the chain.

In order to preserve the pintle openings of both links from wear, the openings of the inside links are lined with replaceable bushings which are confined against axial displacement by the lapping of the outside links, and the pintles while bearing directly in the outside links, are held against turning therein by suitably shaped heads, or by the use of cotter pins, or by both of said expedients, so that the only appreciable wear occurs between the intermediate portion of the pintle and the bushing of the inside link, both of which parts are readily replaceable.

In order that the invention may be fully understood, the preferred embodiment thereof will be described in connection with the accompanying drawings, in which—

Figure 1 is a side elevation of several links embodying the features of the present invention, articulated as in use.

Figures 2, 3, and 4 are, respectively, a top plan view, a side elevation, and a transverse section of an inside link employed in Figure 1, the plane of section of Figure 4 being indicated by the line $4^x$—$4^x$ of Figure 3.

Figures 5 and 6 are, respectively, a side elevation and a vertical transverse section on the line $6^x$—$6^x$ of Figure 5, showing an inside link adapted to enter into the chain of Figure 1, but modified in design to render it suitable for mounting an excavating bucket or other implement thereon.

Figures 7 and 8 are, respectively, a plan view of an outside link together with a portion of an inside link articulated with one end thereof, and a transverse section of such an outside link in a plane indicated by the line $8^x$—$8^x$ of Figure 7.

Figure 9 is a horizontal sectional detail view of a typical articulating joint between an inside and an outside link, and which is suitable for all the forms of link disclosed.

Figures 10 and 11 are detail perspective views of two forms of pintle which may be employed in the articulation of the links.

1 (Figures 1 to 4) and $1^a$ (Figures 5 and 6) represent inside links, and 2 (Figures 1, 7, 8 and 9) represents outside links adapted to enter into a chain such as shown in Figure 1, in which the links are articulated through means of pintles 3 (Figures 1, 7, 9 and 10) or $3^a$ (Figure 11). The inside links have relatively narrow articulating ends 4, corresponding approximately to one-third of the transverse dimension of the articulated chain, and these ends have pintle openings 5 lined with bushings 6 which constitute pintle bearings; said bushings preferably corresponding in construction to one of the forms illustrated in my copending application Serial No. 745,987, particularly with respect to the feature of circumferential adjustability to bring different sectors of the bushing successively into position of greatest wear in the use of the chain, and the principal structural characteristic of which consists in designing the bushing, as well as the link opening that receives it, with major and minor axes so that, on the one hand, the bushing will not rotate in the opening, and on the other hand, it may be reversed in position, as by turning it 180° about a vertical axis to bring either half of its wearing surface to the outer end of the link, or, by rotating it 180° upon a horizontal axis, bringing either quadrant of the portion which is outermost into the lower outer sector which marks the position in which the greatest abrasion occurs.

The inner links 1, whether designed as in Figures 2, 3, and 4, or as in Figures 5 and 6, have formed integrally with them, in the plane of the bases through which they encounter guide sheaves or pulleys when in use, broad lateral flanges 7 providing chain-track or rail sections braced by bracket fins 8 extending diagonally from the flanges to the vertical webs 9 of the links, thus developing a transverse dimension and rigidity of structure in the inside link sufficient to afford the same lateral stability to the chain when an inside link is in bearing upon a sheave, as is obtained when an outside link is in bearing. Flanges 7 terminate in beveled faces 10 which leave the narrow articulating ends 4 unobstructed in entering the bifurcated ends of the outside links, and also affording substantial articulation with and continuation of the bearing track or rail sections of the outside links, as hereinafter described.

Inside link 1 or 1ª has its vertical medial webs 9 stiffened at top by the integral head 11 extending to and merging with the articulating ends 4 which constitute bosses at the ends of the web 9; and diagonal bracing fins 12 are introduced between the bosses 4 and the web 9 to stiffen the intermediate portion of the link transversely.

The construction of the inside link shown in Figures 5 and 6 differs from that shown in Figures 2, 3, and 4 only in the provision of the deep vertical fin 13 with its marginal strengthening rib 14 and perforated corner bosses 15 that adapt the link to mount an excavating bucket or other implement. The illustrated design of the fin 13 is such that the load which it receives on its bosses 15 will be transmitted to the link 1, 1ª very close to the articulating ends 4, since the marginal rib 14 merges with the bosses 4 constituting said articulating ends.

The outside links comprise a pair of spaced side bars 16 cast with top and bottom bearing rails 17 preferably identical, and thereby rendering the link reversible in position to prolong its service; and the vertical webs 18 uniting said rails, the intermediate longitudinal laterally presented stiffening ribs 19, the articulating bosses 20 spaced apart to receive the inside link bosses 4, and the framed anchoring bosses 21 through the medium of which the intermediate ribs 19 merge with the articulating bosses 20. Said bars 16 are integrally united by means of center hubs 22 intermediate the ends of the outside link and constituting bearings for engagement with sprockets through which the chain is driven. Hubs 22 are preferably made hollow and cored with openings 23 affording escape for accumulated soil or material which might obstruct their bearing on the sprockets, and these openings are at both top and bottom. By the design of the hub 22 and its relation to the side bar 16, it is particularly adapted to stiffen the side bars against stresses which would tend to displace one vertically to the other about the axis of the hub.

The outside link has articulating openings 24 (Figure 9) in which the pintles 3 find direct bearing; but the head 25 of a pintle fits between the ledges 27 of the articulating bosses 20 and is thus held against rotation so that there is not material wear between the pintle and the outside links. Pintles 3 are secured against axial displacement by means of pins 28 passing diametrically through the inserted ends of the pintles, the ends of these pins being depressed, as shown at 29, into the recesses 30 afforded by the framed anchoring bosses 21, thus lending further security against rotation of the pintle and preventing withdrawal of the securing pin. Inasmuch as the openings 30 occur on both sides of the link, removal of a pintle is readily effected by inserting a tool in the opening 30 opposite to that which receives the depressed end of the pin, and driving the depressed end outward until the pin can be removed. Pin 28 can be of square section, which will adapt it to fit the opening shown in the end of the pintle of Figure 10, or it may be round to fit the section of opening shown in the pintle 3ª (Figure 11), and in either instance deflecting its end 29 into an opening 30 will secure it against removal.

I claim:

1. A chain comprising articulated inside and outside links; an outside link comprising a pair of web-members in spaced parallel planes, constructed with articulating ends; an inside link comprising a single web-member in a plane intermediate of the planes of the outside link members and constructed with articulating ends fitting between the articulating ends of the outside link; the outside link members providing a broad stabilizing base through which the link rests upon bearing surfaces which the chain encounters in use; and the inside link single web-member being constructed with broad lateral flanges in a plane perpendicular to the plane of its web, providing a stabilizing base of substantially the same width as the base provided by the members of the outside link.

2. A chain comprising articulated inside and outside links; an outside link comprising a pair of members in spaced vertical planes, and constructed with articulating ends; an inside link comprising a single web-member in a vertical plane intermediate of the planes of the outside link members and constructed with single articulating ends fitting between the ends of the outside link members; said outside link members having laterally enlarged longitudinally extending base rails providing one portion of a supporting and stabilizing base for the chain; and the inside link having integral lateral flanges in a plane perpendicular to the plane of its web-member, providing another portion of the stabilizing base of the chain, substantially corresponding in width to and in continuity of the portion of the base provided by the outside link.

3. A conveyer chain, comprising articulated inside and outside links and having a substantially continuous broad stabilizing base upon which the chain travels over supporting surfaces, which it encounters in use; an outside link of said chain comprising a pair of web-members in spaced vertical planes, having articulating ends, and laterally enlarged bearing rails perpendicular to the planes of its webs, and providing a portion of the supporting base of the chain, said rails extending beneath the articulating ends of said outside link; and an inside link comprising a single web-member in a vertical plane intermediate of the planes of the web-members of the outside link and constructed with articulating ends symmetrical with the plane of said single web-member, fitting between the ends of the outside link members and with laterally presented flanges in the plane of the base of the chain, terminating short of the articulating ends of said link but proximate to the rails of the outside link, and providing a portion of the supporting base of the chain in continuity of the portion provided by the outside link.

4. A chain comprising articulated inside and outside links; an outside link comprising a pair of web-members in spaced longitudinal vertical planes and constructed with articulating ends providing one portion of a stabilizing and supporting base for the chain; and an inside link comprising a single web-member in an intermediate longitudinal vertical plane, constructed with articulating ends fitting between the ends of the members of the outside link, and constructed with base flanges in a plane perpendicular to the plane of said single web-members; providing a portion of the stabilizing and supporting base of the chain in continuity of the portion provided by the outside link; the outside link having a vertical space between its rails for the reception of teeth of a driving sprocket, the base portion of the inside link providing a transversely continuous bearing surface for the inter-tooth portions of the driving sprocket, and the articulating ends of the inside link transmitting thrust from the sprocket teeth to said single web.

5. A conveyer chain comprising articulated inside and outside links, an outside link comprising a pair of web-members in spaced vertical longitudinal planes of the chain, each member being constructed with longitudinal base rails and end bosses, said end bosses constituting spaced articulating portions of the link; and an inside link comprising a single web-member in a vertical longitudinal plane intermediate of the plane of the web-members of the outside link, constructed with lateral flanges in a plane perpendicular to the planes of the web-members and with end bosses, said end bosses constituting articulating portions which fit between the articulating portions of the outside link, and impart thrust to the single web-member.

6. A conveyer link comprising articulated inside and outside links; an outside link comprising a pair of web-members in spaced vertical longitudinal planes of the chain and constructed with articulating ends; an inside link comprising a single web-member in a vertical longitudinal plane of the link intermediate of the said planes of the outside link and constructed with lateral flanges enlarging its base to adapt it to form a continuation of the base provided by the outside link and an integral articulating end-boss fitting between the articulating ends of the outside link and bracing fins uniting the end-boss of the inside link to the web-member thereof.

7. A conveyer link comprising articulated inside and outside links; an outside link comprising a pair of members in spaced vertical longitudinal planes of the chain and constructed with articulating ends; an inside link comprising a single web-member in a vertical longitudinal plane of the link intermediate of the said planes of the outside link, and constructed with lateral base flanges enlarging it to a width substantially corresponding with the width of the outside link with articulating end-bosses fitting between the articulating ends of the outside link; and with integral bracing fins between its single web-member and its end-bosses and between its said web-member and base flanges.

Signed at Chicago Heights, Illinois, this 24th day of March, 1926.

CLAUDE RORABECK.